United States Patent
Harita et al.

(10) Patent No.: US 6,803,411 B2
(45) Date of Patent: Oct. 12, 2004

(54) POLYVINYL ALCOHOL POLYMER FILM, METHOD OF PRODUCING THE SAME AND POLARIZATION FILM

(75) Inventors: Shigeyuki Harita, Kurashiki (JP); Takanori Isozaki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 96 days.

(21) Appl. No.: 09/845,271

(22) Filed: May 1, 2001

(65) Prior Publication Data

US 2001/0039319 A1 Nov. 8, 2001

(30) Foreign Application Priority Data

May 2, 2000 (JP) ........................................ 2000-133361

(51) Int. Cl.$^7$ .............................................. C08F 16/06
(52) U.S. Cl. ........................ 525/56; 252/585; 264/1.31; 264/1.34; 359/490; 428/220; 525/61; 525/62
(58) Field of Search .............................. 525/56, 61, 62; 252/585; 264/1.31, 1.34; 359/490; 428/220

(56) References Cited

U.S. PATENT DOCUMENTS

| | | | | |
|---|---|---|---|---|
| 2,173,304 A | * | 9/1939 | Land et al. ................. | 359/490 |
| 2,237,567 A | * | 4/1941 | Land ........................... | 359/491 |
| 2,289,714 A | * | 7/1942 | Land ........................... | 430/15 |
| 2,892,382 A | * | 6/1959 | Ryan et al. ................. | 359/465 |
| 2,897,544 A | * | 8/1959 | Marks ........................ | 156/494 |
| 2,996,956 A | * | 8/1961 | Ryan et al. ................... | 430/9 |
| 2,997,390 A | * | 8/1961 | Land ........................... | 430/213 |
| 3,058,393 A | * | 10/1962 | Ryan et al. ................. | 359/489 |
| 3,208,902 A | * | 9/1965 | Around et al. ............... | 428/336 |
| 3,531,351 A | * | 9/1970 | Buzzell ....................... | 156/249 |
| 4,387,133 A | * | 6/1983 | Ichikawa et al. ........... | 428/215 |
| 6,166,117 A | | 12/2000 | Miyazaki | |
| 6,337,369 B1 | | 1/2002 | Isozaki | |

FOREIGN PATENT DOCUMENTS

| | | |
|---|---|---|
| JP | 03-219928 | 9/1991 |
| JP | 05-239229 | 9/1993 |
| JP | 05-245857 | 9/1993 |
| JP | 05-301239 | 11/1993 |
| JP | 5-337967 | 12/1993 |
| JP | 6-51120 | 2/1994 |
| JP | 6-118231 | 4/1994 |
| JP | 6-138319 | 5/1994 |
| JP | 9-43431 | 2/1997 |
| JP | 10-39137 | 2/1998 |
| JP | 10-166519 | 6/1998 |
| JP | 11-123731 | 5/1999 |

* cited by examiner

*Primary Examiner*—Judy M. Reddick
(74) *Attorney, Agent, or Firm*—Oblon, Spivak, McClelland, Maier & Neustadt, P.C.

(57) ABSTRACT

Difference in retardation between two points separated by 1 cm along the TD direction of a polyvinyl alcohol polymer film 6 is 5 nm or less. The length of a surface for drying a polyvinyl alcohol polymer film 6 is 3 m to 200 m, and the water content of the polyvinyl alcohol polymer film 6 when peeled after passing through the drying surface is 50% by weight or less, in film formation.

16 Claims, 1 Drawing Sheet

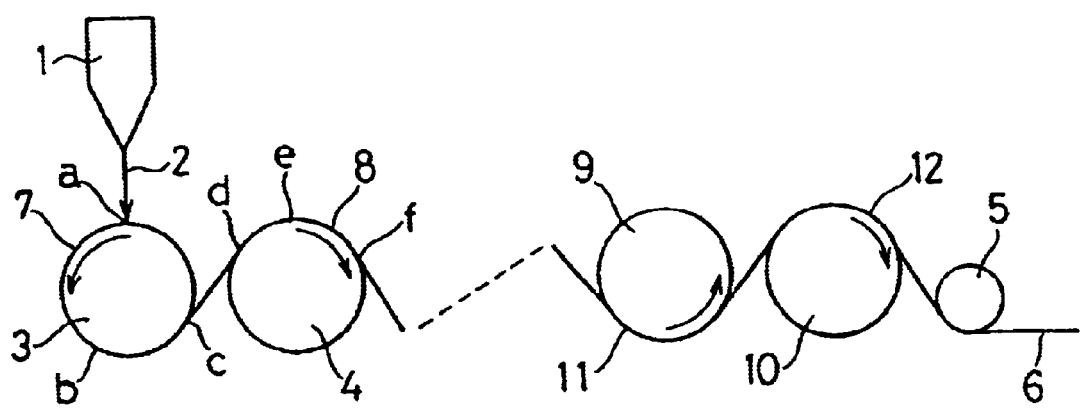

POLYVINYL ALCOHOL POLYMER FILM, METHOD OF PRODUCING THE SAME AND POLARIZATION FILM

BACKGROUND OF THE INVENTION

1. Field of the Invention

The present invention relates to a polyvinyl alcohol polymer film which is useful as a production material of a polarization film having few color irregularities or mottles and is not wrinkled easily in stretching, and method of producing the same and a polarization film.

2. Description of the Prior Art

A polarizer having functions of transmission and shielding of light is a fundamental constituent element of a liquid crystal display (LCD), together with a liquid crystal having a function of switching light. Applied fields of such an LCD have expanded from small apparatuses such as electronic calculators, wristwatches and the like in the initial period of its development, to, in the recent years, apparatuses in a wide range such as lap top personal computers, word processors, liquid crystal color projectors, navigation systems for automobiles, liquid crystal televisions, personal phones, indoor and outdoor measuring apparatuses and the like, and there is a need for polarizers manifesting fewer color irregularities and having larger area than conventional products.

For obtaining a polarizer having general constitution, a polyvinyl alcohol polymer film (hereinafter, polyvinyl alcohol polymer is abbreviated as "PVA", and a polyvinyl alcohol polymer film is abbreviated as a "PVA film", in some cases) is monoaxially stretched before dyeing, or dyed before monoaxial stretching, and subjected to fixing treatment with a boron compound (in some cases, dyeing and fixing treatment are conducted simultaneously), then, a protection film such as a triacetic cellulose (TAC) film, cellulose acetate butyrate (CAB) and the like is laminated on the polarization film.

However, even in the case of a PVA film being apparently uniform, a polarization film obtained from such PVA film may include color irregularities which are not observed easily from outside. These color irregularities are recognized easily only in the final product (polarizer) obtained by laminating a protective film and the like. When color irregularities are manifested in this final product, also indirect materials such as a protective film and the like which are good items are discarded as defective items, leading to large loss in cost. Conventionally, for reducing color irregularities, decrease in thickness irregularity and birefringence irregularity has been investigated, as described, for example, in Japanese Laid-open Patent Publication No. 6-138319. By decreasing thickness irregularity and birefringence irregularity, it has made possible to decrease color irregularities to a certain extent and to satisfy the level required at that time, however, it has been found that it is difficult to reduce color irregularities at the level problematical in the final product (polarizer) having recent increased performance. Further, it has been found that even if thickness irregularity and birefringence irregularity are evaluated as irregularities of the whole film surface, they dot not correctly correspond to actual color irregularities perceived by human eyes.

Further, for obtaining a polarization film having larger area along with increased size of a liquid crystal display screen, it is necessary to obtain a wide PVA film. However, in conventional wide PVA films, curl easily occurs to cause wrinkle on both end parts, leading to poor yield along cross direction, in stretching, consequently, a polarization film having large area is not obtained easily. Particularly, wrinkle is easily produced in films having width of 2 m or more.

Therefore, an object of the present invention is to provide a PVA film useful as a production raw material of a wide polarization film which manifests fewer color irregularities, does not produce wrinkle easily in stretching, and can realize increase in size of a liquid crystal display screen.

SUMMARY OF THE INVENTION

For attaining the above-mentioned objects, in the PVA film of the present invention, difference in retardation between two points separated by 1 cm along the TD direction of the film is 5 nm or less.

Here, the retardation is represented by "birefringence×film thickness" of a PVA film. This birefringence is determined by a degree of molecular orientation of the above-mentioned film imparted in a film production process and the like. Further, the machine direction (MD direction) of a PVA film is the film longitudinal direction, and the transverse direction (TD direction) to this machine direction is the film width direction.

According to the present invention, by setting difference in retardation between two points separated by 1 cm along the TD direction of a PVA film as 5 nm or less, a wide good item (polarization film) which manifests fewer color irregularities and does not easily produce wrinkle in stretching due to unknown reason can be produced in high yield, enabling increase in size of a liquid crystal display screen.

In the production method of the present invention, a surface for drying a PVA film has a length from 3 m to 20 m, and the water content of the PVA film when peeled after passing through this drying surface is 50% by weight or less.

According to the present invention, a PVA film useful as a production raw material of the intended polarization film can be obtained infallibly.

BRIEF DESCRIPTION OF THE DRAWINGS

In any event, the present invention will become more clearly understood from the following description of preferred embodiments thereof, when taken in conjunction with the accompanying drawings. However, the embodiments and drawings are given only for the purpose of illustration and explanation, and are not to be taken as limiting the scope of the present invention in any way whatsoever, which scope is to be determined by the appended claims.

FIG. 1 is a schematic front elevational view of a drum type film forming machine employing a method according to one embodiment of the present invention when the polyvinyl alcohol polymer film for a polarization film is produced.

DETAILED DESCRIPTION OF EMBODIMENTS OF THE INVENTION

One embodiment of the present invention will be illustrated referring to a stretching.

FIG. 1 shows a drum type film forming machine adopting a melt extrusion method which melts and extrudes a water containing PVA (may contain an organic solvent and the like) as an example of producing the PVA film of the present invention. By this film forming machine, for example, a constant amount of a melted PVA 2 is extruded through a flat die 1 onto a rotating first roll 3 for casting, and one surface of a PVA film 6 is dried on this periphery surface. Thereafter, other surface of the PVA film 6 is dried on the periphery surface of a second roll 4, and finally, peeled by a peeling roll 5 to give a PVA film 6. This PVA film 6 is passed through a humidity controlling machine, inspection machine and the like, not shown, and wound on a winder.

In the above-described film forming machine, according to the present invention, among surfaces for drying the PVA film 6, the peripheral surface of the above-mentioned first roll 3 is called a first drying surface 7 and the peripheral surface of the second roll 4 is called a second drying surface 8. Here, as shown in the figure, it is preferable that a plurality of rolls of the first roll 3, second roll 4, n-th roll 9, (n+1)-th roll 10 are placed, and drying is conducted over multi-stages of two-stages or more. By this constitution, both sides of the PVA film 6 are together dried uniformly by a first and second drying surfaces 7 and 8 and the like, so that color irregularities do not occur and that wrinkle is not produced in stretching, which enables to obtain the good PVA film 6. Further, retardation irregularity within a small region of about 1 cm does not increase easily.

It is desirable that the length (d to f via e) of the above-mentioned second drying surface 8 is set at 1.2 times or shorter of the length (a to c via b) of the first drying surface 7. Particularly, 1 times or less is preferable, and 0.95 times or less is more preferable, and 0.9 times or less is most preferable. When the length (d to f via e) of the second drying surface 8 is longer than 1.2 times of the length (a to c via b) of the first drying surface 7, wrinkle is easily made on both end parts of the PVA film 6 in stretching, and not only the yield of width of the resulting polarization film tends to deteriorate, but also color irregularities tend to occur. Further, retardation irregularity within a small region of about 1 cm tends to increase. Note that it is desirable that the length (d to f via e) of the second drying surface 8 is 0.02 times or more of the length (a to c via b) of the first drying surface 7.

The above-mentioned drying surfaces 7, 8, 11 and 12 are heated by steam, heat medium, hot water, electric heater and the like. Further, means may also be used accessorily such as spraying of hot air, cold air and the like onto a PVA film, suction of air, vapor and the like around a PVA film, and the like. In the above-mentioned embodiments, a plurality of rolls 3, 4, 9 and 10 are used, belts and the like can also be used in place of them. When the PVA film 6 is dried by using a plurality of stages of the drying surfaces 7, 8, 11 and 12, it is also possible to adopt drying methods using a floating drier such as a tenter method, free method and the like, not limited to drying methods using rolls and belts, in the latter stages.

Further, in the above-mentioned film forming machine, the length (a to c via b) of the first drying surface of a PVA film referred to in the present invention means a length of a drying surface from position a at which the above-mentioned melted PVA 2 is first brought into contact with the periphery surface of the first roll 3, through position b, to position c at which the PVA 2 is peeled from the first roll 3, and it is important that the length of this first drying surface is within the range of 3 m to 200 m. When the length of the first drying surface is less than 3 m or over 200 m, the resulting polarization film tends to produce color irregularities. The length of this first drying surface is preferably within the range of 3.5 m to 150 m, more preferably within the range of 4 m to 100 m, further preferably within the range of 5 m to 80 m.

The water content of the PVA film 6 when it is passed through the length (a to c via b) of the above-mentioned first drying surface and peeled from the first roll 3 is 50% by weight or less, preferably 45% by weight or less, further preferably 40% by weight or less, and preferably 10% by weight or more. When the water content is over 50% by weight, color irregularities occur when the film is made into a polarization film, and a good polarization film is not obtained. Further, retardation irregularity within a small region of about 1 cm increases easily.

The water content (% by weight) of the above-mentioned PVA film 6 was measured by using a fiber type infrared water content meter.

In the present invention, it is important that, in the resulted PVA film 6, difference in retardation between two points separated by 1 cm along the TD direction is 5 nm or less. The difference in retardation is preferably 4 nm or less, more preferably 3 nm or less. When the difference in retardation is over 5 nm, color irregularities of the resulting polarization film are seen easily, and a good polarization film cannot be obtained. Even if retardation between two points separated by over 1 cm is over 5 nm, when difference in retardation between two points separated by 1 cm is 5 nm or less, problems do not occur easily since color irregularities are not easily recognized by human eyes.

The thickness of the PVA film 6 is preferably from 5 to 150 $\mu$m, most preferably from 35 to 80 $\mu$m. Though the width of the PVA film 6 is not particularly restricted, particularly it is preferably applied to a film having a width of 2 m, since the film of the present invention does not easily produce wrinkle even if the width is 2 m or more while a conventional film having a width of 2 m or more easily produce wrinkle problematically in stretching.

PVA used in the present invention is produced, for example, by hydrolyzing a polyvinyl ester obtained by polymerizing a vinyl ester. Further, there are listed modified PVAs obtained by graft copolymerization of the above-mentioned PVA with unsaturated carboxylic acids or derivatives thereof, unsaturated sulfonic acids or derivatives thereof, $\alpha$-olefins having 2 to 30 carbon atoms and the like in a proportion of less than 15 mol %, modified PVAs produced by hydrolyzing modified polyvinyl esters obtained by copolymerizing a vinyl ester with unsaturated carboxylic acids or derivatives thereof, unsaturated sulfonic acids or derivatives thereof, $\alpha$-olefins having 2 to 30 carbon atoms and the like in a proportion of less than 15 mol %, so-called polyvinyl acetal resins obtained by partially crosslinking hydroxyl groups of non-modified or modified PVA with aldehydes such as formalin, butyl aldehyde, benzaldehyde and the like.

As the above-mentioned viny ester, vinyl acetate, vinyl formate, vinyl propionate, vinyl butyrate, vinyl pivalate, vinyl versatate, vinyl laurate, vinyl stearate, vinyl benzoate and the like are exemplified.

On the other hand, the comonomer used in the modified PVA is copolymerized mainly for the purpose of modifying PVA, therefore, used in an amount which does not lose the purpose of the present invention. As such comonomer, there are listed, for example, olefins such as ethylene, propylene, 1-butene, isobutene and the like; acrylic acid and salts thereof; acrylic esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate and the like; methacrylic acid and salts thereof, methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate and the like; acrylamide derivatives such as acrylamide, N-methylacrylamide, N-ethylacrylamide, N,N-dimethylacrylamide, diacetoneacrylamide, acrylamidepropanesulfonic acid and salts thereof, acrylamidepropyldimethylamine and salts thereof, N-methylolacrylamide and derivatives thereof and the like; methacrylamide derivatives such as methacrylamide, N-methylmethacrylamide, N-ethylmethacrylamide, methacrylamidepropanesulfonic acid and salts thereof, methacrylamidepropyldimethylamine and salts thereof, N-methylolmethacrylamide and derivatives thereof and the like; N-vinylamides such as N-vinylformamide, N-vinylacetamide, N-vinylpyrolidone and the like; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and the like; nitrites such as acrylonitrile, methacrylonitrile and the like; vinyl halides such as vinyl chloride, vinylidene chloride, vinyl fluoride, vinylidene fluoride and the like; allyl compounds such as allyl acetate, allyl chloride and the like; maleic acid and salts or esters thereof, itaconic acid and salts or esters thereof, vinylsilyl compounds such as vinyltrimethoxysilane and the like; isopropenyl acetate, and the like. Among them, α-olefins are preferable, and ethylene is particularly preferable. The modification amount of modified PVA is preferably less than 15 mol %.

The degree of hydrolysis of PVA is preferably at least 90 mol %, more preferably at least 95 mol %, further preferably at least 98 mol %, in particular most preferably at least 99 mol %, from standpoints of polarization characteristic and durcharacteristic.

The above-mentioned degree of hydrolysis represents a ratio of units actually hydrolyzed into vinyl alcohol units among units which can be converted into vinyl alcohol units by hydrolysis. The degree of hydrolysis of PVA was measured by a method described in JIS.

The degree of polymerization of PVA is preferably at least 500 from the standpoints of polarization characteristic and durability, and more preferably at degree 1000, further preferably at least 1500, and particularly, most preferably at least 2500. The upper limit of the degree of polymerization of PVA is preferably at least 8000, more preferably at least 6000.

The above-mentioned degree of polymerization of PVA is measured according to JIS K 6726. Namely, PVA is re-hydrolyzed and purified, then, intrinsic viscosity is measured in water at 30° C. from which the degree of polymerization is calculated.

For producing a PVA film using the above-mentioned PVA, for example, a PVA solution prepared by dissolving PVA in a solvent is subjected to a casting film formation method, wet film formation method (discharging into a poor solvent), gel film formation method (a PVA aqueous solution is once cooled and gelled, then, solvent is removed by extraction to obtain a PVA film), and a combination method thereof, in addition to used of a film formation method by a melt-extrusion method using a water-containing PVA. Among them, the casting film formation method and melt extrusion film formation method are preferable since an excellent polarization film is obtained.

Examples of the solvent for dissolving PVA used in producing a PVA film include dimethylsulfoxide, dimethylformamide, dimethylacetamide, N-methylpyrolidone, ethylene glycol, glycerin, propylene glycol, diethylene glycol, triethylene glycol, tetraethylene glycol, trimethylolpropane, ethylenediamine, diethylenetriamine, glycerin, water and the like, and one or more of them can be used. Among them, water, dimethylsulfoxide, or a mixed solvent of water and dimethylsulfoxide is suitably used.

The PVA concentration of a PVA solution or water-containing PVA used in producing a PVA film is preferably from 10 to 70% by weight, more preferably from 10 to 60% by weight, further preferably from 13 to 55% by weight, an particularly, most preferably from 15 to 50% by weight. This PVA solution or water-containing PVA may also contain a plasticizer, surfactant, dichroic dye and the like, if necessary.

As the plasticizer used in producing a PVA film, a polyhydric alcohol is preferably added. Examples of the polyhydric alcohol include ethylene glycol, glycerin, propylene glycol, diethylene glycol, diglycerin, triethylene glycol, tetraethylene glycol, trimethylolpropane and the like, and one or more of them can be used. Among them, diglycerin, ethylene glycol and glycerin are suitably used for improving stretching property.

The amount of additive polyhydric alcohol is preferably from 1 to 30 parts by weight, more preferably from 3 to 25 parts by weight, and most preferably from 5 to 20 parts by weight, based on 100 parts by weight of PVA. When the addition amount is less than 1 part by weight, dyeing property and stretching property may decrease in some cases, and when it is over 30 parts by weight, a PVA film may become too soft, leading to reduction in handling in some cases.

In producing a PVA film, it is preferable to add a surfactant. The kind of the surfactant is not particularly restricted, and anionic surfactants or nonionic surfactants are preferable. As the anionic surfactant, for example, carboxylic acid-type anionic surfactants such as potassium laurate, ester sulfate-type anionic surfactants such as octyl sulfate and the like, and sulfonic acid-type anionic surfactants such as dodecylbenzenesulfonate and the like, are suitable. As the nonionic surfactant, for example, alkyl ether-type nonionic surfactants such as polyoxyethylene oleyl ether and the like, alkylphenyl ether-type nonionic surfactants such as polyoxyethylene octylphenyl ether and the like, alkyl ester-type nonionic surfactants such as polyoxyethylene laurate and the like, alkylamine-type nonionic surfactants such as polyoxyethylene laurylamino ether and the like, alkylamide-type nonionic surfactants such as polyoxyethylene lauric amide and the like, polypropylene glycol ether-type nonionic surfactants such as polyoxyethylene polyoxypropylene ether and the like, alkanolamide-type nonionic surfactants such as oleic acid diethanol amide and the like, allylphenyl ether-type nonionic surfactants such as polyoxyalkylene allylphenyl ether and the like, are suitable. These surfactants can be used alone or in combination of two or more.

The amount of the surfactant added is preferably from 0.01 to 1 part by weight, more preferably from 0.02 to 0.5 parts by weight, and particularly, most preferably from 0.05 to 0.3 parts by weight, based on 100 parts by weight of PVA. When the addition amount is less than 0.01 part by weight, effects of improving stretching property and improving dyeing property are not manifested easily, and when it is over 1 part by weight, the surfactant may be eluted on the surface of a PVA film and cause blocking, leading to reduction in handling in some cases.

For producing a polarization film from the PVA film of the present invention, for example, the PVA film may advantageously be subjected to dyeing, monoaxial stretching, fixing treatment, drying treatment, further heat treatment, if necessary, and the operation order of dyeing, monoaxial stretching and fixing treatment is not particularly restricted. Further, monoaxial stretching may also be conducted twice or more times.

The dyeing can be conducted at any period among before monoaxial stretching, during monoaxial stretching and after monoaxial stretching. As the dye used in the dyeing, dichroic dyes such as iodine-potassium iodide; Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; Direct Orange 26, 39, 106, 107, and the like can be used alone or in combination of two or more. Generally, dyeing is conducted, usually, by immersing a PVA film in a solution containing the above-mentioned dye, however, treatment conditions and treatment methods thereof such as mixing with a PVA film before film formation and the like, are not particularly restricted.

For the monoaxial stretching, a wet stretching method or dry heat stretching method can be used, and it can be conducted in hot water such as a boric acid aqueous solution and the like (may also in a solution containing the above-mentioned dye or a fixing treatment bath described below) or in air using a PVA film after water absorption. The stretching temperature is not particularly restricted, and when a PVA film is stretched in hot water (wet stretching), temperatures from 30 to 90° C. are suitable, and when dry heat stretching is conducted, temperatures from 50 to 180° C. are suitable. The stretching ratio in monoaxial stretching (in the case of multi-stage stretching, the total stretching ratio) is preferably at least 4 times, and particularly, most preferably at least 5 times, from the standpoint of polarization characteristic. The upper limit of the stretching ratio is not particularly restricted, and ratios of 8 times or less are preferable since then uniform stretching can be easily obtained. The thickness of a film after stretching is preferably from 3 to 75 $\mu$m, more preferably from 5 to 50 $\mu$m.

The fixing treatment is often conducted with the purpose of rendering adsorption of the above-mentioned dye onto a PVA film stronger. Into a treating bath used for the fixing treatment, boric acid and/or boron compound is usually added. If necessary, an iodine compound may also be added into the treating bath.

The drying treatment of the above-mentioned PVA film is conducted at a temperature preferably from 30 to 150° C., more preferably from 50 to 150° C.

On a polarization film obtained as described above, a protective film having optically transparent and having mechanical strength is normally laminated on each surface or on one surface thereof to provide a polarizer to be used. As the protective film, a triacetic cellulose (TAC) film, cellulose acetate butyrate (CAB) film, acrylic film, polyester film and the like are used. Further, as the adhesive for lamination, PVA adhesives and urethane adhesives are listed, and among them, PVA adhesives are suitable.

EXAMPLES

The following examples illustrate the present invention specifically, but do not limit the scope of the present invention. Water content, difference in retardation and dichroic ratio in the examples were evaluated by the following methods.

Water Content

The water content of a PVA film was measured using a fiber type infrared water content meter (IM-3SCV, MODEL-1900 (L), manufactured by K.K. Fuji Work).

Difference in Retardation

Retardation of an arbitrary point of a PVA film was measured using an automatic birefringence meter (KOBRA21SDH, manufactured by Oji Keisoku Kiki K.K.). Further, retardation of a position separated by 1 cm along the width direction of the film was measured, and difference between the both measured values was obtained.

Dichroic Ratio

Dichroic ratio was used as an index for evaluating polarization characteristic of the resulted polarization film. This dichroic ratio was obtained from the following formula using transmittance Ts (%) and degree of polarization P (%) obtained by calculation and measurement at 2° field of view and C light source using a spectrophotometer according to Standards of Electronic Industries Association of Japan (EIAJ) LD-201-1983.

$$\text{Dichroic ratio} = \log(Ts/100 - Ts/100 \times P/100)/\log(Ts/100 + Ts/100 \times P/100)$$

Example 1

100 parts by weight of PVA having a degree of hydrolysis of 99.9 mol % and a degree of polymerization of 1750 was impregnated with 10 parts by weight of glycerin and 140 parts by weight of water, and the mixture was melt-kneaded, and melt-extruded on a metal roll (corresponding to first roll) having a first drying surface having a length of 8 m and formed into a film which was peeled at a water content of 38% by weight, then, a free surface (opposite surface to the surface contacted with the first roll) of the PVA film was brought in contact with a metal roll (corresponding to second roll) having a second drying surface having a length of 4 m and dried, to obtain a PVA film having a width of 2.5 m and a thickness of 75 $\mu$m. The maximum value of difference in retardation between two points separated by 1 cm of this film was 3 nm.

The above-mentioned PVA film was subjected to preliminary swelling, dyeing, monoaxial stretching, fixing treatment, drying and heat treatment in this order, to produce a polarization film. Namely, the above-mentioned PVA film was immersed in water of 30° C. for 5 minutes to effect preliminary swelling, and immersed in an aqueous solution of 35° C. having an iodine concentration of 0.4 g/liter and a potassium iodide concentration of 40 g/liter for 3 minutes. Subsequently, monoaxial stretching was conducted at 5.5 times in an aqueous solution of 40° C. having a boric acid concentration of 4%, then the stretched film was immersed in an aqueous solution of 30° C. having a potassium iodide concentration of 40 g/liter, a boric acid concentration of 40 g/liter and a zinc chloride concentration of 10 g/liter for 5 minutes to effect fixing treatment. After that, the PVA film was removed, and dried with hot air of 40° C. and further, heat-treated at 100° C. for 5 minutes, while maintaining the length constant.

Thus obtained polarization film had a thickness of 22 $\mu$m, and was a good item without color irregularity. It had a transmittance of 43.2%, a polarization degree of 98.8%, and a dichroic ratio of 34.6.

Example 2

An aqueous solution having a PVA concentration of 15% by weight containing 100 parts by weight of PVA having a degree of hydrolysis of 99.9 mol % and a degree of polymerization of 4000 and 10 parts by glycerin was cast on a metal belt having a first drying surface having a length of 50 m and formed into a film which was peeled at a water content of 30% by weight, then, a free surface (opposite surface to the surface contacted with the belt) of the PVA film was brought in contact with a metal roll having a second drying surface having a length of 4 m and dried, to obtained a PVA film having a width of 3 m and a thickness of 75 μm. The maximum value of difference in retardation between two points separated by 1 cm of the film was 2 nm.

The above-mentioned PVA film was subjected to preliminary swelling, dyeing, monoaxial stretching, fixing treatment, drying and heat treatment in this order, to produce a polarization film. Namely, this PVA film was immersed in water of 30° C. for 5 minutes to effect preliminary swelling, and immersed in an aqueous solution of 35° C. having an iodine concentration of 0.4 g/liter and a potassium iodide concentration of 40 g/liter for 3 minutes. Subsequently, monoaxial stretching was conducted at 5.6 times in an aqueous solution of 40° C. having a boric acid concentration of 4%, then the stretched film was immersed in an aqueous solution of 30° C. having a potassium iodide concentration of 40 g/liter, a boric acid concentration of 40 g/liter and a zinc chloride concentration of 10 g/liter for 5 minutes to effect fixing treatment. Then, the PVA film was removed, and dried with hot air of 40° C. and further, heat-treated at 100° C. for 5 minutes, while maintaining the length constant.

Thus obtained polarization film had a thickness of 22 μm, and was a good item without color irregularity. It had a transmittance of 42.9%, a polarization degree of 99.7%, and a dichroic ratio of 43.0.

Comparative Example 1

A PVA film was obtained in the same treatment as in Example 1 except that the water content of a PVA film when peeled after passing through the first drying surface was 53% by weight in Example 1. The maximum value of difference in retardation between two points separated by 1 cm of this film was 10 nm.

The above-mentioned PVA film was subjected to the same treatment as in Example 1. There was a tendency that the both end parts were curled and wrinkle easily occurred in stretching. The resulted polarization film carried a lot of color irregularities, and was not a film considered as the final level (final product). Physical properties were evaluated using parts having relatively small color irregularities, to find a transmittance of 43.2%, a degree of polarization of 98.3% and a dichroic ratio of 31.76.

Comparative Example 2

A PVA film was obtained in the same treatment as in Example 2 except that the water content of a PVA film when peeled after passing through the first drying surface was 55% by weight in Example 2. The maximum value of difference in retardation between two points separated by 1 cm of this film was 7 nm.

The above-mentioned PVA film was subjected to the same treatment as in Example 2. There was a tendency that the both end parts were curled and wrinkle easily occurred in stretching. Color irregularities were significant, and a good polarization film could not be obtained.

Although the present invention has been fully described in connection with the preferred embodiments thereof with reference to the accompanying stretchings which are used only for the purpose of illustration, those skilled in the art will readily conceive of numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of producing a polyvinyl alcohol polymer film which comprises:
    contacting a polyvinyl alcohol polymer with a surface for drying (first drying surface) to obtain a polyvinyl alcohol polymer film,
    wherein the length of the first drying surface is within the range of 3 m to 200 m, and
    wherein the water content of the film when peeled after passing through the first drying surface ranges from 10% to 50% by weight,
    and contacting said polyvinyl alcohol polymer film with a second drying surface, wherein both sides of the polyvinyl alcohol polymer film are dried in two or more stages and one side of the film is dried by the first drying surface and the other side of the film is dried by the second drying surface, and
    wherein the length of said second drying surface is 1.2 times or less of the length of said first drying surface.

2. The method of claim 1, wherein the width of the film is 2 m or more.

3. A polyvinyl alcohol polymer film produced by the method of claim 1, which is characterized by a difference in retardation between two points separated by 1 cm along the TD direction of the film of 5 nm or less.

4. A polyvinyl alcohol polymer film produced by the method of claim 2, which is characterized by a difference in retardation between two points separated by 1 cm along the TD direction of the film of 5 nm or less.

5. The polyvinyl alcohol film produced by the method of claim 1, which has a difference in retardation between two points separated by 1 cm along the TD direction of the film of 4 nm or less.

6. The polyvinyl alcohol film produced by the method of claim 1, which has a difference in retardation between two points separated by 1 cm along the TD direction of the film of 3 nm or less.

7. The polyvinyl alcohol film produced by the method of claim 1, which has a thickness ranging from 5 to 150 μm.

8. The polyvinyl alcohol film produced by the method of claim 1, which has a thickness ranging from 35 to 80 μm.

9. The polyvinyl alcohol film produced by the method of claim 1, which has a width of 2 m or more.

10. The polyvinyl alcohol film produced by the method of claim 1, which is produced using polyvinyl alcohol (PVA) having a degree of polymerization of at least 500.

11. The polyvinyl alcohol film produced by the method of claim 1, which is produced using polyvinyl alcohol (PVA) having a degree of polymerization of at least 2500.

12. The polyvinyl alcohol film produced by the method of claim 1, which is produced using polyvinyl alcohol (PVA) having a degree of hydrolysis of at least 90 mol %.

13. The polyvinyl alcohol film produced by the method of claim 1, which is produced using polyvinyl alcohol (PVA) having a degree of hydrolysis of at least 99 mol %.

14. The polyvinyl alcohol polymer film produced by the method of claim 1 that is suitable for use as a polarization film.

15. A polarization film comprising the polyvinyl alcohol polymer film produced by the method of claim 1.

16. A liquid crystal display (LCD) comprising the film produced by the method of claim 1.

* * * * *